United States Patent Office 3,702,353
Patented Nov. 7, 1972

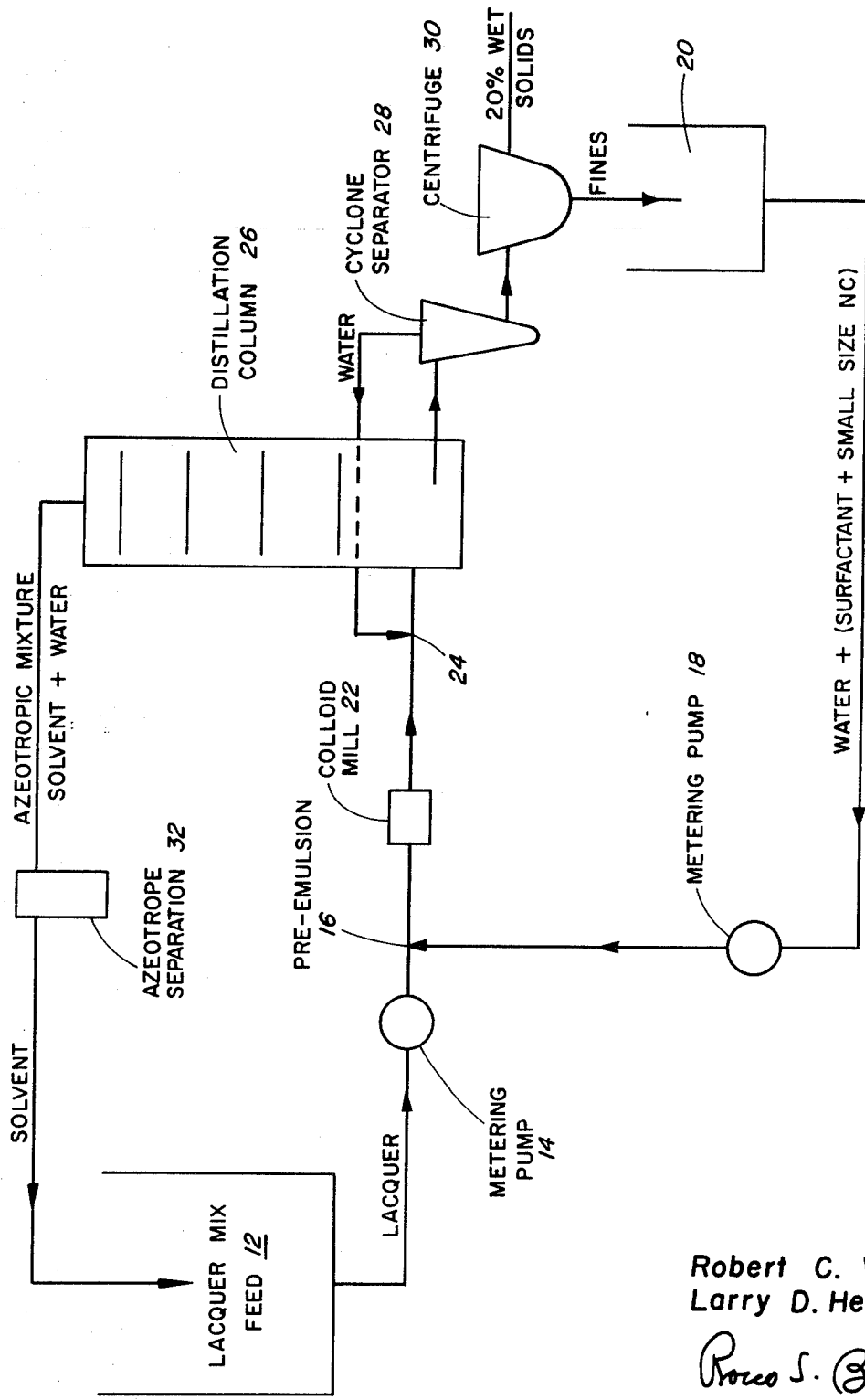

3,702,353
CONTINUOUS PROCESS FOR MANUFACTURING SMALL PARTICLE NITROCELLULOSE
Larry D. Henderson, Bryans Road, and Robert C. Wilson, Indian Head, Md., assignors to the United States of America as represented by the Secretary of the Navy
Filed Sept. 24, 1970, Ser. No. 75,054
Int. Cl. C06b 21/02
U.S. Cl. 264—3 D                    5 Claims

ABSTRACT OF THE DISCLOSURE

A continuous process for manufacturing small particle nitrocellulose, such as plastisol nitrocellulose, wherein the nitrocellulose lacquer is pre-emulsified by contact with a stream of water in a pipe T, completely emulsified in a colloid mill, partially drowned by contact with a second stream of water and completely drowned by passing directly into a distillation column.

BACKGROUND OF THE INVENTION

This invention relates generally to a process for the treatment of nitrocellulose and more particularly to a continuous process for the manufacture of small pelletized particles of nitrocellulose, such as plastisol nitrocellulose, especially suitable for incorporation in explosive and propellant compositions.

Traditionally, small particle nitrocellulose is manufactured in batch processes which are generally stereotype, tedious and expensive. That is, these prior art processes involve preparing a lacquer of the virgin nitrocellulose by dissolving it in a suitable solvent such as nitromethane. The formed lacquer is then transferred to a heated, agitated vessel where it is partially emulsified in a small quantity of water containing a surfactant. This pre-emulsion is then passed through an emulsifying unit and fed into a heated drown tank containing a very large quantity of water, producing an extremely dilute slurry of nitrocellulose. The slurry is then fed into a batch solid bowl centrifuge where approximately only 75 percent of the desired nitrocellulose product is recovered. It is then manually removed from the centrifuge, drummed and transferred to a dry house. If desired, some of the solvent (nitromethane) is recovered by distillation of the water rich filtrate.

In addition to being tedious e.g., due to the various manual maneuvers and transfers of material, and expensive e.g., due to large quantities of water used and inefficient recovery of nitrocellulose and solvents, the nitrocellulose produced by the prior art processes generally contains too high a quantity of residual surfactant which is incompatible with the various high energy materials customarily employed therewith, among other disadvantages. Thus, a need exists for an improved method for producing small particle pelletized nitrocellulose.

SUMMARY OF THE INVENTION

Accordingly, it is one object of the present invention to provide an improved process for the manufacture of small particle pelletized nitrocellulose.

Another object of this invention is to provide an improved process for the manufacture of small particle pelletized nitrocellulose which is less tedious, and less expensive than prior art processes.

Still another object of the instant invention is to provide an improved process for the manufacture of small particle pelletized nitrocellulose which while providing a uniform particle size product with characteristics, such as good cure rate, excellent stability, high tensile properties and good elongation, does not provide a product possessing the disadvantages of the prior art such as particle adhesion to one another and contamination with residual surfactant, among others.

Briefly, these and other objects are accomplished by providing a continuous process for the manufacture of nitrocellulose which employs a new pre-emulsion technique, a new "shock" drowning technique and further provides for a continuous distillation of the nitrocellulose lacquer/emulsion.

BRIEF DESCRIPTION OF THE DRAWING

The sole figure of the drawing is a simplified flowsheet diagram of the process of this invention.

DESCRIPTION OF THE PREFERRED EMBODIMENTS

Referring to the drawing the process of this invention involves initially the conventional preparation of a nitrocellulose lacquer by dissolving in a container 12 the nitrocellulose in an organic, water miscible, partially water miscible, water soluble or partially water soluble volatile solvent medium.

This solvent may be any of those previously used for this purpose and include for example nitromethane, lower aliphatic alcohols, for instance methyl, ethyl and propyl alcohol, acetone, methyl ethyl ketone, methyl acetate, ethyl acetate, the like and mixtures thereof.

The concentration of nitrocellulose, as in past procedures, may vary within a wide range. Generally, the choice of solvent, the viscosity of nitrocellulose employed and the viscosity of the lacquer which varies with different solvents are influencing factors upon the nitrocellulose concentration in the lacquer and may be varied accordingly. Generally, the nitrocellulose content should not exceed about 35 percent by weight of the lacquer. Furthermore, if desired, minor amounts of a stabilizer, such as ethyl centralite and 2-nitrodiphenylamine may be included in the lacquer formulation.

It is preferred, however, that during the hereinbefore-described lacquer preparation, as well as during the pre-emulsification, emulsification and drowning steps hereindescribed below, the temperature of the materials be maintained at from about 110° F. to about 150° F.

The lacquer is drawn from the lacquer mix container 12 and fed through a high speed discharging metering pump 14 and thereafter mixed with a quantity of water (which may or may not contain a surfactant or colloiding agent) at pre-emulsion T mixing point 16, the water having been fed through a metering pump 18 from a water (plus surfactant) container 20. The metering pumps used in the process may be of any conventional variety such as, for example, a Zenith gear pump or a Lapp Pulsa-feeder piston pump.

The high speed stream turbulent mixing of the nitrocellulose lacquer and water at junction 16 provides for the formation of a pre-emulsion mixture of the lacquer and water. For optimum mixing results, the Reynolds number at junction 16 should be 100,000 or greater. This new technique of pre-emulsification eliminates the tedious and time-consuming prior art employment of a large agitated vessel of water or other means of pre-emulsifying using mechanical agitation.

The ratios of nitrocellulose lacquer and water employed in the pre-emulsion process of the present invention (which is predetermined and controlled by the respective metering pumps) are the same as those normally used in prior art procedures. Generally, the amount of water employed is an important factor in determining particle size of the nitrocellulose. Thus, the quantity of water used in the pre-emulsification is determined in some measure by the particle size desired and other factors, such for example, as the solvent employed, and the viscosity and grade of the nitrocellulose used. In general, satisfactory results are achieved when the lacquer to water ratio is within the range of from about 1:1 to about 3:1 parts by weight, respectively.

If a surfactant or colloiding agent is employed in the emulsification process, any of the conventional materials used for this purpose are utilizable. Suitable materials are, for example, alkyl sulfates or sulfonates, alkylaryl sulfonates, alkali metal soaps, alkali metal and ammonium salts of perfluoro acids, alkali metal salts of sulfosuccinic acids, sulfonated oils including sulfonated vegetable oils such as sulfonated castor oil and sulfonated coconut oil, and sulfonated hydrocarbon oils such as sulfonated petroleum fractions and the like and polyglycols such as polyethylene glycol and propylene glycol; corn starch, gum arabic, animal bone glue, dextrin, bentonite, methyl cellulose, casein, agar-agar, gelatin, polyvinyl alcohol and alginates.

After the formation of the pre-emulsion according to this invention, the process continues by the passing of the preemulsified nitrocellulose lacquer/water through a conventional colloid mill 22 or other suitable homogenizer or other suitable emulsifying device in order to attain complete emulsification wherein the lacquer is broken up into small particles which are suspended in water.

At this stage in the prior art processes, i.e. after complete emulsification, the organic solvent was removed by drowning the nitrocellulose lacquer/water emulsification in a hugh tank of water whereby the nitrocellulose particles were separated from the organic solvent by the migration of the solvent from the nitrocellulose into the water phase. The nitrocellulose/water slurry was then transferred to a centrifuge and about a 75 percent recovery of nitrocellulose particles usually received. If desired, the organic solvent was removed from the water after being transferred to a distillation apparatus and about a 70 percent recovery of the solvent usually realized.

However, in accordance with the process of this invention the aforedescribed tedious, time-consuming and wasteful characteristics of the prior art processes are essentially eliminated.

After being fed through a colloid mill 22 the emulsification of nitrocellulose lacquer/water is contacted at a junction 24 with another high speed turbulent stream of water which, in effect, begins the "shock" drowning of the emulsification to separate the nitrocellulose particles from the organic solvent. Again, for optimum results the Reynolds number at junction 24 should be 100,000 or greater. This partially drowned emulsion is then passed directly into a distillation apparatus 26 wherein the "shock" drowning operation is completed.

The "shock" drowning of the nitrocellulose lacquer/water emulsion in the distillation column 26 is accomplished by allowing the emulsion to enter the distillation column 26 near the bottom, i.e. in the water rich zone. Thus, the combination of continuously driving off the solvent from the top of the column 26, under vacuum, the continuous refluxing of water in the column and the relatively small quantity of water that is being added to the column at any instant allows for the separation of the nitrocellulose particles from the organic solvent. Hence, the small pelletized nitrocellulose particles which have been formed settle to the bottom of the column in a concentrated slurry. The slurry density and column operating conditions may be controlled by automatic valves which maintain the desired level in the bottom of the distillation column.

The nitrocellulose slurry is then pumped from the bottom of the distillation column 26 into a centrifuge 30 from which a very high recovery of small pelletized nitrocellulose is realized. In the preferred embodiment of the present invention, as illustrated by the flowsheet drawing, in order to provide for a continuous process, the nitrocellulose slurry is pumped from the bottom of the distillation column 26 and allowed to pass through a conventional water separator 28, whereby the water which is separated is then recycled into the process to serve as the high speed turbulent stream of water, which as described hereinbefore, acts as the beginning of the drowning operation at junction 24. The nitrocellulose slurry which is then about a 20 percent concentrate of solids is then directed into the centrifuge 30 and a high recovery of about 20% wet small pelletized nitrocellulose particles is obtained.

The water residue from centrifuge 30, which contains about 1 percent of extremely small size particles of nitrocellulose (and surfactant or colloid if employed) is then directed to the water container 20 from which it is recycled into the process to again serve as the high speed turbulent water employed in the T mixing pre-emulsion process at junction 16, as described hereinabove.

The organic solvent which is driven off the distillation column in an azeotropic mixture and is readily separated from the water by a conventional distillation means 32 and is also recycled to the lacquer mix container 12 to be employed once again in the nitrocellulose lacquer preparation procedure.

Thus, by employing the continuous process as herein described, a high recovery of contaminant-free nitrocellulose particles (about 95 percent) having a uniform average size of approximately 12 microns have been produced.

Having generally described the invention the following example is given for purposes of illustration. It will be understood that the invention is not limited to this example, but is susceptible to different modifications that will be recognized by one of ordinary skill in the art.

A lacquer mixture of 2 parts of 28.0 percent water wet nitrocellulose (12.6 percent nitrogen), and 25 parts nitromethane was prepared at 140° F. (ethyl centralite was also employed as a stabilizer). An emulsion was prepared by passing 2 parts of the lacquer and 1 part of water through a colloid mill. Then 1 part of the emulsion was mixed with 20 parts of water in a pipe T (with a Reynolds number of greater than 100,000 at the junction) line and a portion collected in a glass receiving flask. This flask was placed under vacuum (50–100 mm.) and heated by a water bath at 55° C. to remove the nitromethane by distillation. Pelletized nitrocellulose was collected by centrifugal action and dried. The particles had an average particle size of about 12 microns.

Having thus described the invention, what is claimed and desired to be secured by Letters Patent of the United States is:

1. A continuous process for the manufacture of small particle nitrocellulose which comprises forming a nitrocellulose lacquer comprised of nitrocellulose in an organic solvent said solvent being either water miscible, or water soluble, contacting said nitrocellulose lacquer with a stream of water, subjecting the product thereof to an emulsifying action, contacting the emulsion thereof with a second stream of water, feeding the product thereof directly into a distillation apparatus and refluxing whereby the organic solvent is separated from the nitrocellulose particles and water, passing said nitrocellulose particles and water directly from said distillation apparatus into a means for separating said nitrocellulose particles from a portion of the water, recycling said separated portion of water to contact said emulsion, separating the desired nitrocellulose particles from the remaining product thereof and recycling the residual water thereof to contact said nitrocellulose lacquer.

2. The continuous process of claim 1 wherein the organic solvent is recycled to form said nitrocellulose lacquer after being separated from the nitrocellulose particles and water in the distillation apparatus.

3. The process of claim 2 wherein the mixtures resulting from said contacting of the nitrocellulose lacquer with a stream of water and said contacting the emulsion with a second stream of water are characterized by a Reynolds number of at least 100,000.

4. The process of claim 1 wherein the temperature of the materials is maintained at from about 110° F. to about 150° F. during said contacting, subjecting and contacting steps.

5. The process of claim 1 wherein said water miscible or water soluble organic solvent is selected from the group consisting of nitromethane, methyl alcohol ethyl alcohol, propyl alcohol, acetone, methyl ethyl ketone, methyl acetate, ethyl acetate, and mixtures thereof.

References Cited

UNITED STATES PATENTS

| 3,251,823 | 5/1966 | Murphey et al. | 149—96 X |
|---|---|---|---|
| 3,200,092 | 8/1965 | Bergman | 149—96 X |
| 3,329,743 | 7/1967 | Coffee | 149—96 X |

CARL D. QUARFORTH, Primary Examiner

S. J. LECHERT, Jr. Assistant Examiner

U.S. Cl. X.R.

149—91, 94, 100